United States Patent [19]

Iwata et al.

[11] Patent Number: 4,973,499
[45] Date of Patent: Nov. 27, 1990

[54] RECORDING LIQUID HAVING SURFACE TENSION OF AT LEAST 64 DYNE/CM AND VISCOSITY OF AT MOST 2.5 CP AT 25 DEGREES CELSIUS

[75] Inventors: Kazuo Iwata, Yokohama; Shinichi Tochihara, Hiratsuka; Shoji Koike, Yokohama; Yasuko Tomida, Atsugi, all of Japan

[73] Assignee: Canon Kabushiki Kaisha, Tokyo, Japan

[21] Appl. No.: 412,604

[22] Filed: Sep. 26, 1989

Related U.S. Application Data

[63] Continuation of Ser. No. 170,621, Mar. 18, 1988, abandoned, which is a continuation of Ser. No. 931,870, Nov. 18, 1986, abandoned.

[30] Foreign Application Priority Data

Nov. 18, 1985 [JP] Japan ................................ 60-256767

[51] Int. Cl.$^5$ .............................................. B05D 1/36
[52] U.S. Cl. ...................................... 427/261; 106/22
[58] Field of Search ........................... 427/261; 106/22

[56] References Cited

U.S. PATENT DOCUMENTS

| | | | |
|---|---|---|---|
| 4,165,399 | 8/1979 | Germonprez | 427/261 |
| 4,285,727 | 8/1981 | Uehara et al. | 106/22 |
| 4,361,843 | 11/1982 | Cooke et al. | 106/22 |
| 4,381,946 | 5/1983 | Uehara et al. | 106/22 |
| 4,446,174 | 5/1984 | Masakazu et al. | 427/261 |
| 4,508,570 | 4/1985 | Fujii et al. | 106/22 |
| 4,542,089 | 9/1985 | Toganok et al. | 427/261 |
| 4,620,876 | 11/1986 | Fujii et al. | 106/22 |

FOREIGN PATENT DOCUMENTS

| | | |
|---|---|---|
| 0085869 | 8/1983 | European Pat. Off. |
| 1359350 | 7/1974 | United Kingdom |
| 2070049 | 9/1981 | United Kingdom |

Primary Examiner—Merrell C. Cashion, Jr.
Assistant Examiner—Leon R. Horne
Attorney, Agent, or Firm—Fitzpatrick, Cella, Haper & Scinto

[57] ABSTRACT

A recording liquid with well-balanced characteristics is provided which comprises a colorant and a liquid medium, and has a surface tension to 64 dyne/cm or more at 25° C. and a viscosity of 2.5 centipoises or less at 25° C. A recording method employing the recording liquid is also provided.

33 Claims, No Drawings

RECORDING LIQUID HAVING SURFACE TENSION OF AT LEAST 64 DYNE/CM AND VISCOSITY OF AT MOST 2.5 CP AT 25 DEGREES CELSIUS

This application is a continuation of application Ser. No. 170,621 filed Mar. 18, 1988, which is a continuation of prior application Ser. No. 931,870 filed on Nov. 18, 1986, both of which are now abandoned.

BACKGROUND OF THE INVENTION

1. Field of the Invention

This invention relates to a recording liquid to be used for various recording instruments such as writing implements, printers, etc. (hereinafter called an ink), particularly an ink suitable for the ink jet recording system in which recording is effected by ejecting liquid droplets through the orifice of a recording head and also, to a recording method by use thereof.

2. Description of the Related Art

The ink jet recording system has the advantages of generating minimal noise during recording being sufficiently adaptable to color printing, and capability of obtaining recorded images of high resolution at high speed.

In ink jet recording systems, solutions of various water-soluble dyes dissolved in water or mixtures of water and organic solvents have been extensively used as the ink. Such ink is generally required to have the performances as shown below in relation to the recording medium.

(1) No feathering should occur at the printed portion on the recording medium.

(2) The ink should dry rapidly (including drying by absorption) on the recording medium.

(3) The ink should cause not clog of the nozzle of a printer, even if printing may be intermitted indefinitely.

(4) Frequency response for discharging ink in comformity with the printing speed of a printer should be good.

(5) Storage stability of ink should be high.

(6) Safety should for human use be high, etc.

Of these requisite performances, the point which is particularly technically difficult is to accomplish simultaneously the above items (1), (2), (3) and (4).

In order to satisfy the various requisite performances as described above, various studies have been made on colorants such as water-soluble dyes, water and organic solvents as media and additives such as surfactants, etc.

However, in spite of a large number of studies up to date, all of the above requisite performances are not necessarily satisfied, and therefore in order to cover the inferior points of the ink performance at the printing stage, a large number of recording medium called paper for ink jet recording have been proposed.

As described above, use of a specific ink and a paper intended for ink jet recording and adapted for said ink will give substantially satisfactory results with respect to quality of printed letters and drying fixing characteristic of ink. However, when ink jet recording is practiced for papers generally used in business such as copying paper, report paper, bond paper, slip paper, continuous business form paper, high-size paper, low-size paper, plain paper, etc., various problems will ensue (depending on the properties of the paper used) such as delay in fixing and drying, feathering of ink, etc.

For example, an organic solvent such as glycol is often added into an ink for ink jet recording for the purpose of preventing drying, clogging of nozzle, etc. When recording is effected on a plain paper with high size degree with such an ink, unpractically long time is required for drying of ink due to low liquid-absorbing property of these papers. Also, for enhancing ink absorptivity, a surfactant can be added to the ink. However, in this case, although drying speed can be improved, feathering of the printed letters becomes greater, thereby ensuing another problem that no image of high quality can be obtained. It is also proposed to add a strongly alkaline substance in place of a surfactant, but in this case, the image quality, etc., are influenced by the kind of the additive in the paper. For example, no effect can be obtained in neutral papers, etc. Also, such an ink which is strongly alkaline is highly dangerous for use in households or offices.

For example, Japanese Laid-open Patent Publication No. 213067/1983 discloses an ink for ink jet recording containing a dissolving agent for dyes. However, when printing is effected on a plain paper by use of this ink, there are problems such that a long time is required for drying, that printing speed is slow, etc.

SUMMARY OF THE INVENTION

An object of the present invention is to provide an ink having the general performances as described above, particularly as an ink for ink jet recording with sufficient drying fixing speed for every kind of recording medium, and which is capable of forming images of high quality with little feathering and a recording method by use thereof.

The above object can be accomplished by the present invention, as specified below.

In one aspect, the present invention provides a recording liquid comprising a colorant and a liquid medium, having a surface tension of 64 dyne/cm or more at 25° C. and a viscosity of 2.5 cp or less at 25° C.

The present invention also provides a recording liquid for on-demand type ink jet recording composed mainly of a colorant and a liquid medium, having a surface tension of 64 dyne/cm or more at 25° C. and a viscosity of 2.5 cp or less at 25° C.

In another aspect, the present invention provides a recording method which performs recording by attaching liquid droplets of a recording liquid onto a recording medium, wherein a recording liquid having a surface tension at 25° C. of 64 dyne/cm or more and a viscosity of 2.5 cp or less at the recording liquid, and a recording medium which has been sized and has cellulose fibers exposed on the surface to be recorded.

DETAILED DESCRIPTION OF THE PREFERRED EMBODIMENTS

To describe in more detail about the present invention, the present inventors have studied in detail about the surface tension and the viscosity of an ink in order to satisfy at the same time various requisite performances as described above in an ink, particularly an ink for ink jet recording, and consequently found that by controlling the surface tension to various values, the extent of feathering of an ink on paper which is subjected to sizing and has fibers exposed, particularly on a paper with low size degree, can be controlled to some extent. Other performance features, however cannot be endowed by only such a control, although by controlling the viscosity to various values, the fixing drying characteristic of an ink depending on the size degree of paper can be controlled to some extent, but other performances cannot be endowed similarly by such a control.

Accordingly, the present inventors have studied intensively the effects of surface tension and the viscosity on the fixing and drying characteristic of ink, feathering of ink stability of ink, frequency response, etc. Consequently they found that by maintaining the relationship between the surface tension and the viscosity at a specific relationship, an ink, particularly an ink for ink jet recording can be obtained which satisfies the various requisite performances described above and particularly is free from the problem of causing feathering of ink along the fibers of paper to lower the quality of printed letters even in a paper with low size degree. Such a remarkable improvement can be attained by maintaining the surface tension of the ink at 64 dyne/cm or higher at 25° C. and at the same time its viscosity at 2.5 centipoises or less at 25° C., more preferably maintaining the surface tension at 65 dyne/cm or higher and the viscosity at 2.2 cp or less.

In the present invention, the upper limit of the surface tension is about 70 dyne/cm and the lower limit of the viscosity is 1.5, more preferably 1.7.

The colorant to be used in the ink of the present invention may be itself known. For example, in soluble colorants such as pigments or disperse dyes may be also used. Preferable colorants are water-soluble dyes as typified by direct dyes, acidic dyes, basic dyes, reactive dyes, colorants for foods, etc. Particularly, those suitable as the ink for ink jet recording system and satisfying the requisite performances of color forming property, clearness, stability, light resistance and others may include: direct acids such as C.I. Direct Black 17, 19, 32, 51, 62, 71, 108, 146, 154;
C.I. Direct Blue 6, 22, 25, 71, 86, 90, 106, 199;
C.I. Direct Red 1, 4, 17, 28, 83;
C.I. Direct Yellow 12, 24, 26, 44, 86, 98, 100, 142;
C.I. Direct Orange 34, 39, 44, 46, 60;
C.I. Direct Violet 47, 48;
C.I. Direct Brown 109;
C.I. Direct Green 59, etc.
acidic dyes such as C.I. Acid Black 2, 7, 24, 26, 31, 52, 63, 112, 118;
C.I. Acid Blue 9, 22, 40, 59, 93, 102, 104, 113, 117, 120, 167, 229, 234, 254;
C.I. Acid Red 1, 6, 8, 32, 37, 51, 52, 80, 85, 87, 92, 84, 115, 180, 256, 317, 315;
C.I. Acid Yellow 11, 17, 23, 25, 29, 42, 49, 61, 71;
C.I. Acid Orange 7, 19;
C.I. Acid Violet 49, etc., as preferable ones, and further include C.I. Basic Black 2;
C.I. Basic Blue 1, 3, 5, 7, 9, 24, 25, 26, 28, 29;
C.I. Bacis Red 1, 2, 9, 12, 13, 14, 37;
C.I. Basic Violet 7, 14, 27;
C.I. Food Black 1, 2, etc.

The above examples of colorant are particularly preferable for the ink of the present invention, but the colorant to be used for the ink of the present invention are not limited to these colorants.

Such a colorant may be used in the ink at a proportion generally of about 0.5 to 30 wt. %, more preferably 1 to 25 wt. %, most preferably 1 to 5 wt. %.

The solvent to be used in the ink of the present invention is water or a solvent mixture of water with a water-soluble organic solvent: particularly preferably are solvent mixtures of water with a water-soluble organic solvent, containing a polyhydric alcohol having the drying prevention effect of ink as the water-soluble organic solvent. Also, as the water, it is preferable to use deionized water in place of ordinary untreated water containing various ions. Examples of the water-soluble organic solvent to be mixed with water may include, for example, alkyl alcohols having 1 to 4 carbon atoms such as methyl alcohol, ethyl alcohol, n-propyl alcohol, isopropyl alcohol, n-butyl alcohol, sec-butyl alcohol, tert-butyl alcohol, isobutyl alcohol and the like; amides such as dimethylformamide, dimethylacetamide and the like; ketones or ketoalcohols such as acetone, diacetone alcohol, etc.; ethers such as tetrahydrofuran, dioxane, etc.; polyalkylene glycols such as polyethylene glycol, polypropylene glycol, etc.; alkylene glycols of which alkylene moiety contains 2 to 6 carbon atoms such as ethylene glycol, propylene glycol, butylene glycol, triethylene glycol, 1,2,6-hexanetriol, thiodiglycol, hexylene glycol, diethylene glycol, etc.; glycerine; lower alkyl ethers of polyhydric alcohols such as ethylene glycol methyl (or ethyl) ether, diethylene glycol methyl (or ethyl) ether, triethylene glycol monomethyl (or ethyl) ether, etc.; N-methyl-2-pyrrolidone, 1,3-dimethyl-2-imidazolidinone, triethanolamine, sulforane, etc. Among these many water-soluble organic solvents, polyhydric alcohols such as diethylene glycol, lower alkyl ethers of polyhydric alcohols such as triethylene glycol monomethyl (or ethyl) ether are preferred.

The content of the above water-soluble organic solvent in the ink may be generally within the range of from 2 to 70 wt. %, preferably from 5 to 65 wt. %, more preferably from 10 to 60 wt. %, based on the total weight of the ink.

On the other hand, the water content is required to be 60 wt. % or more, preferably 75 wt. % or more.

The ink of the present invention comprises the components as described above, and it is necessary to control the surface tension of the ink to 64 dyne/cm or higher at 25° C., and at the same time the viscosity to 2.5 centipoises or less at 25° C.

The control of the surface tension at 25° C. of the ink to 64 dyne/cm or higher can be conducted by selecting and combining properly the ratio of water and the organic solvent used as the medium of the ink, the kind of the organic solvent, the kind and the concentration of the dye. When a surfactant is used, the amount employed should be as small as possible. By such control, the surface tension at 25° C. of the ink of the present invention should be preferably within the range of 64 dyne/cm or less.

The viscosity can be controlled by selection and combination of the respective components as mentioned above. Particularly as the dye and the organic solvent, a dye and an organic solvent which are good in compatibility with water and also have relatively low molecular weights should preferably be selected and combined, and their concentrations are preferred not to be too high.

As described above, by adjusting the surface tension of the ink to be 64 dyne/cm or higher and the viscosity to be 2.5 centipoises or less at 25° C. simultaneously, the requisite performances which could not be accomplished at the same time by the ink of the prior art as shown below can be accomplished, with good balance, performances of ink:

(1) No feathering of the printed ink occurs on any kind of recording medea, especially on sized paper having cellulose fibers exposed outside and above all on low-size paper.

(2) fixing and drying of ink is rapid;

(3) no clogging of the nozzles of the printer head occurs even when recording is intermitted;

(4) frequency responsiveness of discharge of ink is in comformity with the printing speed of the printer, etc.

In contrast, an ink having a surface tension not less than 64 dyne/cm but having a viscosity higher than 2.5 centipoises, or an ink having a viscosity not higher than 2.5 centipoises but having a surface tension less than 64 dyne/cm will not satisfy all of the above four conditions. For example, an ink with a viscosity over 2.5 centipoises requires a long time (e.g. 30 seconds or longer) for absorption and permeation of the ink on the recording medium, and therefore no sufficient fixing drying characteristic can be exhibited in an ink jet printer performing printing continuously and at high speed. On the other hand, an ink with a surface tension less than 64 dyne/cm is liable to spread along the fibers of the paper when applied onto a recording medium, particularly a recording paper with low size degree, thus being liable to cause feathering. An ink having either or both of the surface tension and the viscosity outside the present invention will causes the above-mentioned troubles and further causes clogging of a printer nozzle and insufficient frequency responsiveness.

The ink of the present invention comprises the above components and has the physical properties as described above. As already described, the ink of the present invention has the general requisite performances such as discharging stability of ink, stability in the ink pathway, storage stability, frequency response, etc., when employed particularly for an ink jet recording system, and can also form images of high quality without feathering even on plain papers for general office use, etc., other than the paper for ink jet recording on which no image of high quality could be formed due to feathering during printing in the prior art, and is also remarkably excellent in drying fixing characteristic. Therefore, by use of the ink of the present invention, papers widely used in offices or households in general such as copying paper, report paper, bond paper, slip paper, etc., can be sufficiently utilized as the recording medium for the ink jet recording system, whereby popularization of ink jet recording system can be generally accelerated.

The ink of the present invention exhibiting the effects as described above is useful as the ink for various writing implements, various printers and gives images of excellent printing quality on papers, plastic sheets having been subjected to hydrophilic treatment such as corona treatment, etc., or any other desired recording medium.

As a preferable example of the use method, the ink jet recording method is described. Such an ink jet recording method may be any system, provided that it is a system capable of imparting an ink to a recording medium which is the target by releasing effectively the ink from a nozzle, and typical examples of those systems are described in, for example, IEEE Transactions on Industry Applications, Vol. JA-13, No. 1, Febuary, March, 1977; Nikkei Electronics Apr. 19, 1976, Jan. 29, 1973 and May 6, 1974. For the systems described in these literatures, the ink of the present invention can be preferably used. To describe about some of them, there is first mentioned the electrostatic attracting system. In the system, a strong electrical field is given between the nozzle and an accelerating electrode placed several mm ahead of the nozzle to form the ink into particles and withdraw successively the particles from the nozzle, and recording is effected by giving information signals to the deflecting electrodes while the ink withdrawn flies between the deflecting electrodes. Alternatively, without deflection of the ink particles, the ink particles are jetted corresponding to the information signals. Either system is effective for the ink of the present invention.

A second system is to apply high pressure on the ink by a small pump and vibrates the nozzle mechanically with a quartz oscillator, etc., thereby jetting forcibly minute ink particles, and the jetted ink particles are charged corresponding to the information signals simultaneously with jetting. The charged particles are deflected corresponding to the charged quantity when passing through the deflecting electrode plates. As another system utilizing this system, there is a system called the microdot ink jet system and, according to this system, by maintaining the ink pressure and the vibrating condition at adequate values within certain ranges, two kinds of large and small ink droplets are generated from the nozzle chip, of which only the small size liquid droplets are utilized for recording. The specific feature of this system resides in that a group of minute liquid droplets can be used even with a large nozzle diameter as used in the prior art.

A third system is the piezoelectric element system and, according to this system, a piezoelectric element is utilized in place of a mechanical means such as pump in other systems as the means for pressurizing ink. By giving electrical signals to the piezoelectric element to generate mechanical displacement, pressure is applied to the ink thereby to jet the ink through the nozzle.

It is also possible to use effectively the method as disclosed in Japanese Laid-open Patent Publication No. 59936/1979, which is an ink jet system in which an ink subjected to a heat energy action changes abruptly its volume and the ink is discharged through the nozzle by the actuating force due to this change in state.

The above examples show preferable methods for using the ink of the present invention, but the ink of the present invention is not limited to these uses, and it is of course useful as the ink for other uses than ink jet recording system, for example, other printers or writing implements.

The present invention is described in more detail by referring to Examples, Comparative examples and Application examples. In the description, parts and % are on the weight basis, unless otherwise noted.

EXAMPLES 1-6

The following components were mixed, thoroughly stirred to be dissolved and then pressure filtered through a Fluoropore filter with a pore size of 0.45 μ (produced by Sumitomo Denko) to prepare six examples of ink of the present invention.

Ink Composition of Example 1

C.I. Food Black 2: 3 parts
Ethylene glycol: 10 parts
Water: 87 parts

Ink Composition of Example 2

C.I. Food Black 2: 5 parts
Triethylene glycol: 10 parts

Water: 85 parts

Ink Composition of Example 3

C.I. Food Black 2: 3 parts
Glycerine: 20 parts
Water: 77 parts

Ink Composition of Example 4

C.I. Direct Black 154: 3 parts
Glycerine: 10 parts
Ethylene glycol: 5 parts
Water: 82 parts Ink Composition of Example 5

C.I. Direct Black 17: 2 parts
Ethylene glycol: 5 parts
Diethylene glycol: 5 parts
Glycerine: 2 parts
Water: 86 parts Ink Composition of Example 6

D.I. Direct Blue 199: 1 part
Glycerine: 8 parts
Diethylene glycol: 4 parts
Water: 87 parts

COMPARATIVE EXAMPLES 1-3

Similarly as in Example 1, three kinds of inks of Comparative examples were prepared.

Ink Composition of Comparative Example 1

C.I. Food Black 2: 3.0 parts
Diethylene glycol: 30 parts
Water: 65 parts

Ink Composition of Comparative Example 2

C.I. Food Black 2: 5 parts
Polyethylene glycol 400: 10 parts
Water: 85 parts

Ink Composition of Comparative Example 3

(Example 5 of Japanese Laid-open Patent Publication No. 213067/1983)
Water Black 100L (C.I. Direct Black 19): 3.5 parts
Glycerine: 3 parts
Diethylene glycol: 14 parts
Triethanolamine: 0.5 parts
H(OCH$_2$CH$_2$)$_7$OCH$_2$COONa: 10 parts
Dimethylacetoxydioxane: 0.5 parts
Water: 68.5 parts The respective inks of the above Examples and Comparative examples had viscosities (measured by VISCONIC ELD produced by Tokyo Keiki K.K.) and surface tensions (measured by KYOWA CBVP SURFACE TENSIOMETER A-1 produced by Kyowa Kagaku K.K.) at 25° C. as shown in the following Table 1.

TABLE 1

|  | Viscosity | Surface tension (dyne/cm) |
| --- | --- | --- |
| Example 1 | 1.7 | 67.8 |
| Example 2 | 1.7 | 65.0 |
| Example 3 | 2.1 | 69.6 |
| Example 4 | 1.9 | 65.1 |
| Example 5 | 1.8 | 65.3 |
| Example 6 | 2.0 | 66.7 |
| Comparative Example 1 | 2.9 | 60.0 |

TABLE 1-continued

|  | Viscosity | Surface tension (dyne/cm) |
| --- | --- | --- |
| Comparative Example 2 | 2.1 | 61.6 |
| Comparative Example 3 | 2.7 | 66.0 |

By use of the inks of the above Examples and Comparative examples and also an on-demand type in jet printer utilizing a heat-generating element as the discharging energy source of ink (modified product of BJ-80, produced by Canon K. K.) as the ink jet recording device, printing was effected on a continuous business form, and the drying characteristic of the printed letters obtained and extent of feathering were evaluated. The evaluation results and the maximum frequency at which the printer is stably drivable are shown in the following Table 2.

Evaluation items and evaluation method (1) Drying characteristic of printed letters:

As to drying characteristic of printed letters, alphabet and numerical letters were printed by a printer on a commercially available continuous business form paper, and rubbed with a piece of Filter paper (No. 2 (tradename), produced by Toyo Roshi K. K.) 10, 20, 30, 40, 50 and 60 seconds later, and judgment was made on the basis of the seconds until the printed portion was no longer blurred (measured at 20° C.±5° C., 50±10% RH).

o: within 20 seconds,

Δ: within 20–40 seconds, x: 41 seconds or longer.

(2) Occurrence of feathering

As to occurrence rate of feathering, 300 dots were printed so as not to overlap each other by a printer on a commercially available continuous business form and left to stand for 1 hour or longer, and then the number of dots having caused feathering was counted by a microscope and represented in terms of percentage (printed at 20°±5° C., 50±10% RH).

o: 10% or less,

Δ: 11–30%, x: 31% or more.

TABLE 2

|  | Drying characteristic | Feathering occurrence rate | I |
| --- | --- | --- | --- |
| Example 1 | o | o | 3.8 |
| Example 2 | o |  | 2.9 |
| Example 3 | o | o | 3.0 |
| Example 4 | o | o | 3.2 |
| Example 5 | o | o | 3.3 |
| Example 6 | o | o | 3.6 |
| Comparative Example 1 | x | Δ | 2.2 |
| Comparative Example 2 | Δ | x | 1.9 |
| Comparative Example 3 | Δ | Δ | 1.8 |

I; Maximum frequency (KHz) permitting stable driving

What we claim is:

1. A recording liquid comprising 0.5 to 30 wt. % of a water soluble or dispersable dye for forming an image and a liquid medium containing from 30 to 98 wt. % water and 2 to 70 wt. % of a polyhydric alcohol or lower alkyl ether of polyhydric alcohol selected from the group consisting of ethylene glycol, diethylene glycol, triethylene glycol, glycerine, triethylene glycol monomethyl ether and triethylene glycol monoethylether, said recording liquid having a surface tension of 65 dyne/cm or more at 25° C. and a viscosity of 2.2 cp or less at 25° C.

2. A recording liquid comprising 0.5 to 30 wt. % of a water soluble or dispersible dye for forming an image and a liquid medium containing 30 to 98 wt. % of water and 2 to 70 wt. % of an organic solvent for dissolving or dispersing the dye, having a surface tension of 65 dyne/cm or more at 25° C. and a viscosity of 2.2 cp or less at 25° C.

3. A recording liquid according to claim 1, wherein the content of said polyhydric alcohol or lower alkyl ether of polyhydric alcohol is within the range of from 5 to 65% by weight.

4. A recording liquid according to claim 2, wherein the content of the organic solvent is within the range of from 5 to 65% by weight.

5. A recording liquid according to claim 1, wherein the content of the colorant is within the range of from 1 to 5% by weight based on the total weight of the recording liquid.

6. A recording liquid according to claim 2, wherein the content of the colorant is within the range of from 1 to 5% by weight based on the total weight of the recording liquid.

7. A recording liquid according to claim 1, wherein the water content is 60% by weight or more based on the total weight of the recording liquid.

8. A recording liquid according to claim 2, wherein the water content is 60% by weight or more based on the total weight of the recording liquid.

9. A recording liquid according to claim 1, wherein the water content is 75% by weight or more based on the total weight of the recording liquid.

10. A recording liquid according to claim 2, wherein the water content is 75% by weight or more based on the total weight of the recording liquid.

11. A recording method for performing recording by attaching droplets of a recording liquid onto a recording medium, said recording liquid comprising 0.5 to 30 wt. % of a water soluble or disperisble dye for forming an image and a liquid medium containing 30 to 98 wt. % and 2 to 70 wt. % of water and an organic solvent for dissolving or dispersing the recording agent and having a surface tension at 25° C. of 65 dyne/cm or more and a viscosity of 2.2 cp or less wherein said recording medium is sized and has cellulose fibers exposed on the surface to be recorded.

12. A method according to claim 11, wherein said method is an on-demand type ink jet recording method.

13. A recording method according to claim 11, wherein the content of the colorant is within the range of from 1 to 5% by weight based on the total weight of the recording liquid.

14. A recording method according to claim 11, wherein the water content is 60% by weight or more based on the total weight of the recording liquid.

15. A recording method according to claim 11, wherein the water content is 75% by weight or more based on the total weight of the recording liquid.

16. An ink jet recording method for performing recording by ejecting droplets of a recording liquid from a fine nozzle toward a recording medium by the action of heat energy, said recording liquid comprising 0.5 to 30 wt. % of a water soluble or dispersable dye for forming an image and a liquid medium containing 30 to 98 wt. % water and 2 to 70 wt. % of an organic solvent for dissolving or dispersing the recording agent, said recording liquid having a surface tension of 65 dyne/cm or more at 25° C. and a viscosity of 2.2 cp or less at 25° C., wherein said recording medium is sized and has cellulose fibers exposed on the surface to be recorded.

17. A recording method according to claim 16, wherein the content of the dye is within the range of from 0.5 to 30% by weight based on the total weight of the recording liquid.

18. A recording method according to claim 16, wherein the content of the dye is within the range of from 1 to 5% by weight based on the total weight of the recording liquid.

19. A recording method according to claim 16, wherein the liquid medium is a solvent mixture of water and a water-soluble organic solvent.

20. A recording method according to claim 16, wherein the water content is 60% by weight or more based on the total weight of the recording liquid.

21. A recording method according to claim 16, wherein the water content is 75% by weight or more based on the total weight of the recording liquid.

22. A recording liquid according to claim 1, wherein said surface tension is at most 70 dyne/cm.

23. A recording liquid according to claim 1, wherein said viscosity is at least 1.5 cp.

24. A recording liquid according to claim 1, wherein said viscosity is at least 1.7 cp.

25. A recording liquid according to claim 2, wherein said surface tension is at most 70 dyne/cm.

26. A recording liquid according to claim 2, wherein said viscosity is at least 1.5 cp.

27. A recording liquid according to claim 2, wherein said viscosity is at least 1.7 cp.

28. A recording method according to claim 11, wherein said surface tension is at most 70 dyne/cm.

29. A recording method according to claim 11, wherein said viscosity is at least 1.5 cp.

30. A recording method according to claim 11, wherein said viscosity is at least 1.7 cp.

31. A recording method according to claim 16, wherein said surface tension is at most 70 dyne/cm.

32. A recording method according to claim 16, wherein said viscosity is at least 1.5 cp.

33. A recording method according to claim 16, wherein said viscosity is at least 1.7 cp.

* * * * *

UNITED STATES PATENT AND TRADEMARK OFFICE
CERTIFICATE OF CORRECTION

PATENT NO. : 4,973,499

DATED : November 27, 1990

INVENTOR(S) : Kazuo Iwata et al.

It is certified that error appears in the above-identified patent and that said Letters Patent is hereby corrected as shown below:

COLUMN 1:

Line 23, "recording" should read --recording,--.

Line 37, "cause not clog" should read --not cause clogging--.

Line 43, "should for human use" should read --for human use should--.

COLUMN 3:

Line 7, "ink" (first occurrence) should read --ink,--.

Line 54, "Bacis" should read --Basic--.

COLUMN 4:

Line 68, "medea," should read --media,--.

UNITED STATES PATENT AND TRADEMARK OFFICE
CERTIFICATE OF CORRECTION

PATENT NO. : 4,973,499

DATED : November 27, 1990

INVENTOR(S) : Kazuo Iwata et al.

It is certified that error appears in the above-identified patent and that said Letters Patent is hereby corrected as shown below:

COLUMN 5:

Line 25, "causes" should read --cause--.

COLUMN 9:

Line 46, "disperisble" should read --dispersible--.

Line 47, "98 wt.%" should read --98 wt.% water--.

Line 48, "water and" should be deleted.

Signed and Sealed this

Thirtieth Day of June, 1992

Attest:

DOUGLAS B. COMER

*Attesting Officer*　　*Acting Commissioner of Patents and Trademarks*